United States Patent [19]

Tamai et al.

[11] Patent Number: 5,231,325
[45] Date of Patent: Jul. 27, 1993

[54] VIBRATION DEVICE FOR A VIBRATION DRIVEN MOTOR

[75] Inventors: Jun Tamai; Akio Atsuta, both of Yokohama, Japan

[73] Assignee: Canon Kabushiki Kaisha, Tokyo, Japan

[21] Appl. No.: 806,376

[22] Filed: Dec. 13, 1991

[30] Foreign Application Priority Data

Dec. 14, 1990 [JP] Japan .................. 2-402159

[51] Int. Cl.⁵ ........................... H01L 41/08
[52] U.S. Cl. .................. 310/323; 310/328; 310/354; 310/358
[58] Field of Search ........... 310/328, 358, 354, 323

[56] References Cited

U.S. PATENT DOCUMENTS

| | | | |
|---|---|---|---|
| 3,140,859 | 7/1964 | Scarpa | 310/323 |
| 3,843,897 | 10/1974 | Mishiro | 310/323 |
| 4,728,843 | 3/1988 | Mishiro | 310/323 |
| 4,764,702 | 8/1988 | Mishiro | 310/323 |
| 4,885,499 | 12/1989 | Ueha et al. | 310/328 |

FOREIGN PATENT DOCUMENTS

| | | | |
|---|---|---|---|
| 0401762 | 12/1990 | European Pat. Off. | 310/323 |
| 0016275 | 1/1989 | Japan | 310/323 |

Primary Examiner—Mark O. Budd
Assistant Examiner—Thomas M. Dougherty
Attorney, Agent, or Firm—Fitzpatrick, Cella, Harper & Scinto

[57] ABSTRACT

In an ultrasonic vibrator of structure in which an electro-mechanical energy conversion element for generating a vibration is held by and between electrically conductive blocks and in which a mechanical-electrical energy conversion element for detecting the vibration state of the vibrator is inserted between the blocks, the potentials of the blocks are made different from each other by various means. Therefore, the detection of the vibration state becomes possible, for example, by a detecting element.

16 Claims, 6 Drawing Sheets

FIG. 6

VIBRATION DEVICE FOR A VIBRATION DRIVEN MOTOR

BACKGROUND OF THE INVENTION

1. Field of the Invention

This invention relates to an ultrasonic vibrator for a vibration type motor including a member, for example, a rotor, which is in pressure contact with a vibration member. The rotor and the vibration member are moved relative to each other by a vibration generated in a vibration generating element, the vibration member being vibrated by the vibration of the vibration generating element. More particularly, the present invention relates to a vibrator for a pencil-like motor (hereinafter referred to as the pencil-type motor).

2. Related Background Art

There has recently been proposed a vibrator in which two vibration generating elements such as piezo-electric elements are superposed one upon, the other and, electrically conductive metal blocks for receiving such vibration are provided above and below the vibration generating to elements the upper and lower blocks being fastened by fasteners such as electrically conductive bolts, whereby the two vibration generating elements are held between the blocks.

In such a vibrator, a sensor including, for example, a piezo-electric element for detecting the vibration state of the vibration, is provided between the aforementioned vibration generating elements and the upper or lower metal block, with two sensors being required.

Figure 3:
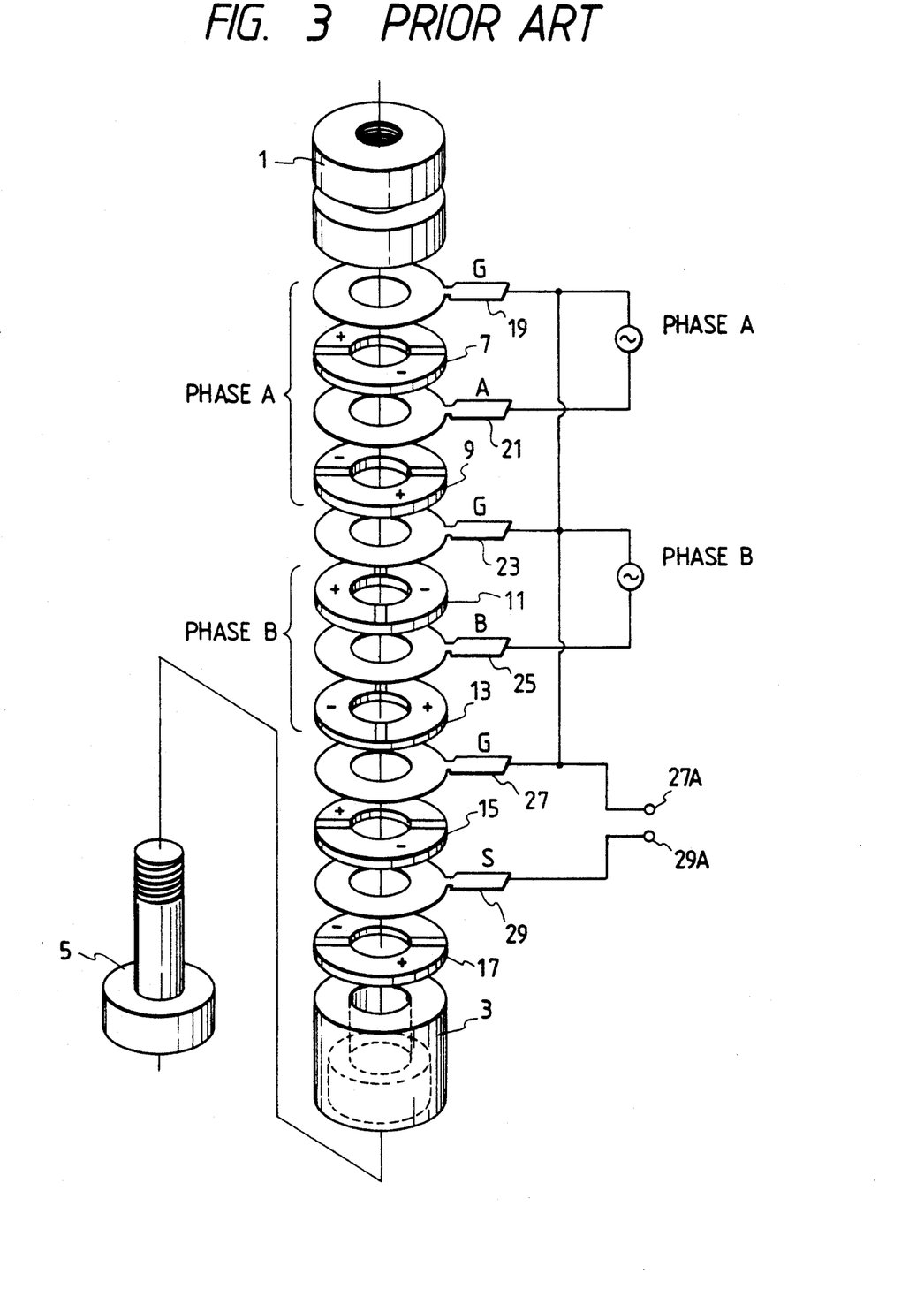
FIG. 3 is an exploded perspective view of a vibration type motor according to the prior art.

A vibrator according to the prior art will now be described briefly with reference to FIG. 3 of the accompanying drawings.

A vibration generating element including piezo-electric elements 7–13 polarized in the direction of thickness is provided between electrically conductive metal blocks 1 and 3, and an AC voltage is applied to the piezo-electric elements 7 and 9 constituting phase A through earth electrodes 19, 23 and an electrode 21 for phase A, while an AC voltage electrically having a phase difference of 90° with respect to said AC voltage is applied to the piezo-electric elements 11 and 13 constituting phase B through earth electrodes 23, 27 and an electrode 25 for phase B.

Two sensors for detecting the vibration state which comprise, for example, piezo-electric elements 15 and 17 are provided between the earth electrode 27 and the lower metal block 3, and an electrical signal corresponding to the rotational (elliptical) vibration state of the upper and lower metal blocks can be detected between an electrode 29 and the earth electrode 27 held between the two sensors 15 and 17. In the case of this prior-art ultrasonic vibrator, at least two sensors for vibration detection are necessary as shown in FIG. 3.

This is because assuming, for example, that the lower sensor 17 is absent, electrode 29 will assume the same potential as earth electrode 27, which contacts the lower metal block 3. Lower metal block 3 has earth potential because it is electrically connected to metal block 1 of earth potential through a bolt 5. Accordingly an electrical signal produced in the sensor 15 could not be detected between output terminals 27A and 29A.

Alternatively assuming that sensor 15 is absent, electrodes 27 and 29 would be short-circuited and an output signal of sensor 17 could not be detected between the output terminals 27A and 29A. On the other hand, if in the state in which sensor 15 has been eliminated, electrode 29 is brought into contact with the lower metal block 3, so that the aforementioned short-circuited state may not be brought about and the sensor 17 is held by and between the electrodes 27 and 29, electrodes 27 and 29 will assume the same potential for a reason similar to that in the case where the sensor 17 is absent and therefore, the output signal of the sensor 17 could not be detected.

As noted above, in the case of the prior-art vibrator, there has been the disadvantage that at least two sensors are required and the vibrator becomes expensive.

SUMMARY OF THE INVENTION

It is an object of the present invention to provide an inexpensive vibrator.

It is another object of the present invention to provide a vibrator of which the vibration state can be detected by a single sensor.

It is still another object of the present invention to provide an inexpensive ultrasonic vibration type motor of the type in which an electrical signal is applied to an electro-mechanical energy conversion element provided on a metal block to thereby excite vibrations in a plurality of different planes of the block and the respective vibrations are endowed with a predetermined phase difference in time to thereby create rotational motion in the surface of the block, and a movable member is brought into pressure engagement with the block by the biasing force of a pressing member having one end thereof functionally engaged with the block and the movable member is frictionally driven by the rotational motion.

In an ultrasonic vibrator of structure in which an electro-mechanical energy conversion element for generating a vibration is held by and between electrically conductive blocks and in which a mechanical-electrical energy conversion element for detecting the vibration state of the vibrator is inserted between the blocks, the potentials of the blocks are made different from each other by various means. Therefore, the detection of the vibration state becomes possible, for example, by a single detecting element.

DETAILED DESCRIPTION OF THE PREFERRED EMBODIMENTS

Figure 1:
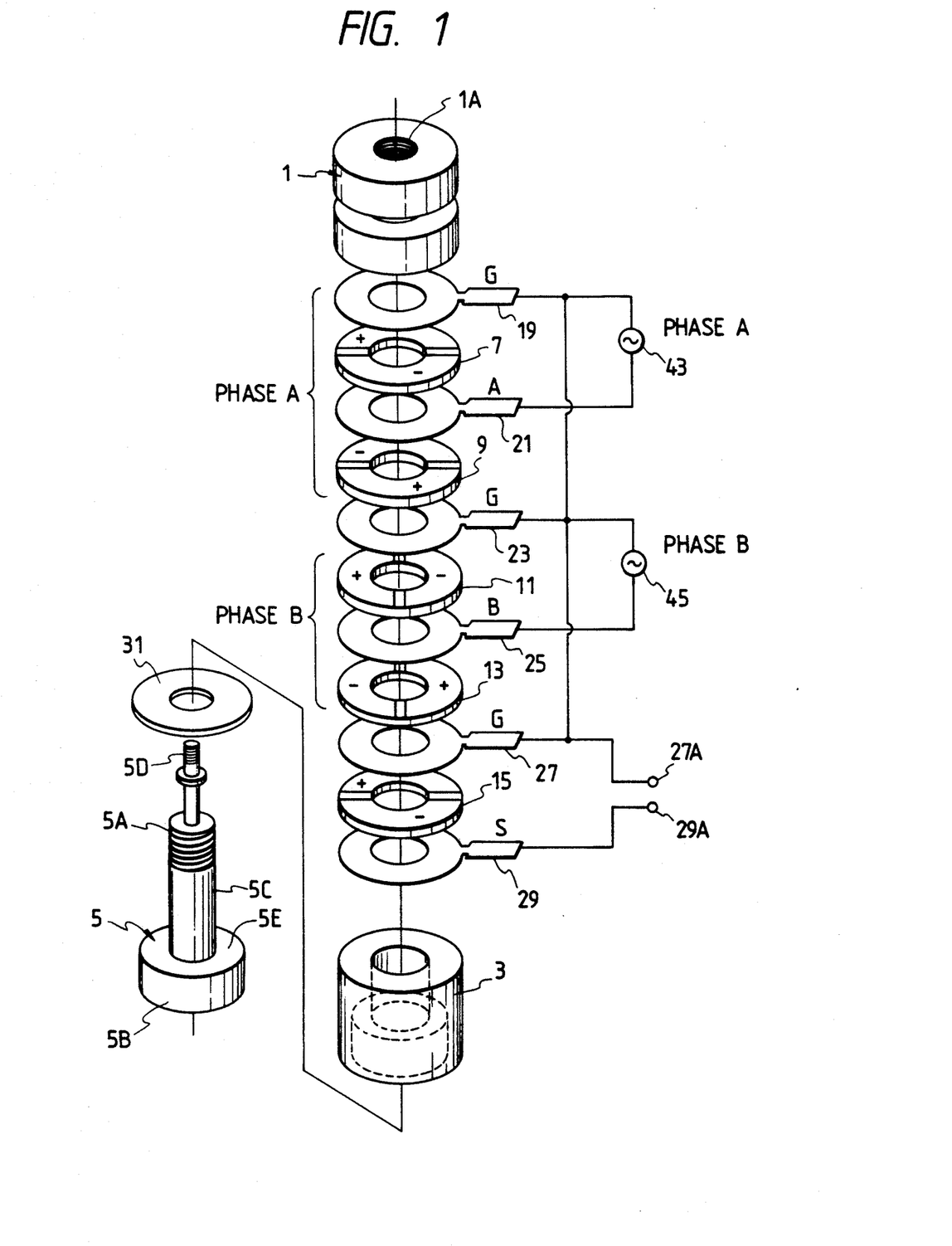
FIG. 1 is a fragmentary exploded perspective view of a vibration type motor to which the present invention is applied.

FIG. 1 is an exploded perspective view of an embodiment of a vibration type motor to which the present invention is applied. In FIG. 1, members functionally identical to those in FIG. 3 are given reference characters identical to those in FIG. 3 to make the corresponding relations therebetween readily understood.

Figure 2:
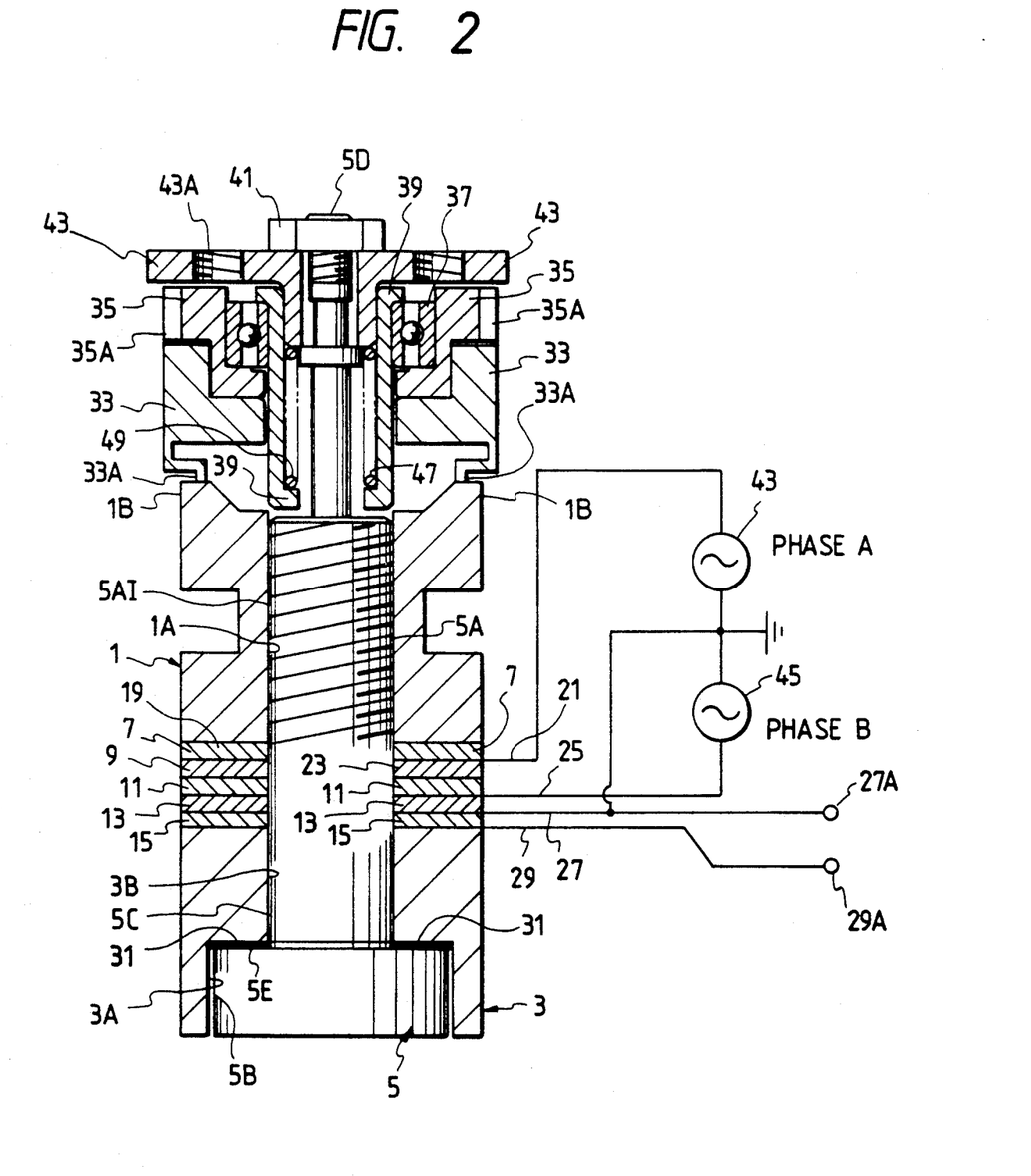
FIG. 2 is a cross-sectional view of the motor shown in FIG. 1.

FIG. 2 is a cross-sectional view of the motor shown in FIG. 1. The difference between the embodiment shown in FIGS. 1 and 2 and the example shown in FIG. 3 is that the piezo-electric element 17 (see FIG. 3) as a mechanical-electrical energy conversion element comprised of PZT or the like is eliminated. In its place, an insulating washer 31, is inserted between the electrically conductive bolt 5 and the block 3 as an insulating member for electrically insulating the upper metal block 1 and the lower metal block 3 from each other.

In FIGS. 1 and 2, reference numeral 1 designates an electrically conductive upper metal block constricted in the middle and having at the center thereof a threaded hole 1A threadably engaged with the threaded portion 5A of an electrically conductive bolt 5. A sliding portion 1B pressure-engaged with the sliding portion 33A of a rotor 33 is provided on the upper surface of the upper metal block 1.

Reference numeral 3 denotes an electrically conductive lower metal block having two holes 3A and 3B of different diameters. The diameters of these holes 3A and 3B are larger than the diameters of the base portion 5B and intermediate portion 5C of the bolt 5, respectively so that the block 3 and the bolt 5 may not contact each other.

Bolt 5 has the aforementioned portions 5A, 5B and 5C and is of such a shape as shown in FIG. 1 which has in the end portion thereof a threaded portion 5D threadably engaged with a nut 41.

Reference numerals 7 to 13 designate hollow circular piezo-electric elements as an electro-mechanical energy conversion element comprised, for example, of PZT. The piezo-electric elements 7 and 9 constitute phase A elements and the piezo-electric elements 11 and 13 constitute phase B elements. In the present embodiment, phase A and phase B each are constituted by two piezo-electric elements, but alternatively each phase may be constituted by a single piezo-electric element.

The diameter of the hollow portion of each piezo-electric element 7-13 is larger than the outer diameter of the intermediate portion 5C of the bolt 5. Each element is polarized on opposite sides of the center line, as shown in FIG. 1, with a direction of polarization in the direction of thickness.

Reference numeral 15 denotes a sensor formed by a piezo-electric element as a mechanical-electric energy conversion element for detecting the vibration state of the metal blocks 1 and 3 constituting an ultrasonic vibrator. The diameter of the hollow portion of the sensor 15 is also larger than the outer diameter of the intermediate portion 5C of the bolt 5 so that the sensor 15 may not contact bolt 5.

Reference numerals 19, 21 and 23 designate electrodes for supplying an AC voltage of e.g. about 20 KHz from a power source 43 to the piezo-electric elements 7 and 9. Reference numerals 23, 25 and 27 denote electrodes for supplying an AC voltage of e.g. about 20 KHz having a phase difference with respect to the AC voltage output from the power source 43 from a power source 45 to the piezo-electric elements 11 and 13. Earth electrode 23 is electrically connected to earth electrode 27 through the intermediate portion 5C of the bolt 5.

Reference numerals 27 and 29 designate electrodes which output to output terminals 27A and 29A, respectively, an electrical signal from the sensor 15 corresponding to the vibration of the metal blocks 1 and 3 as vibration members.

Output terminals 27A and 29A transmit the output signal from the sensor 15 to a vibrator control circuit, now shown.

Reference numeral 31 denotes an insulating washer as an insulating member provided between the upper surface 5E of the electrically conductive bolt 5 and the lower surface of the lower metal block 3 to prevent the lower metal block 3 and the upper metal block 1 from being short-circuited, i.e., assuming the same potential, through the bolt 5. As shown in FIG. 2, the insulating washer 31 has an aperture having a diameter larger than the outer diameter of the intermediate portion 5C of the bolt 5.

Reference numeral 33 designates a hollow rotor rotated when the metal blocks 1 and 3 as a vibrator vibrate in response to the AC voltage supplied thereto. Reference numeral 37 denotes a bearing which is in contact with rotor 33 through an output member 35. Reference character 35A designates an output take-out gear of the vibration type motor provided on the end portion of the output member 35 and engaged with a photo-taking lens driving helicoid screw, not shown. Reference numerals 47 and 49 denote springs provided between a motor fixing member 43 and an intermediate member 39 to bring the rotor 33 into pressure contact with the upper metal block 1 as a vibrator with the intermediate member 39, the bearing 37 and the output member 35 being interposed therebetween.

The operation of the vibration type motor of the above-described construction will now be described.

When AC voltages are supplied from the power sources 43 and 45 to the piezo-electric elements 7-13 for phase A and phase B through the electrodes 19-27, vibrations are excited in the two planes of the vibrators 1 and 3 by vibrations generated in the piezo-electric elements 7-13, and since these vibrations have a predetermined phase difference in time therebetween due to there being a phase difference between the respective AC voltages, a rotational motion is created on the surfaces of the vibrators 1 and 3. Therefore, rotor 33, which is in pressure engagement with the metal block 1 constituting the vibrator, makes rotational motion.

As a result, a rotational output is taken out from the output gear 35A and the helicoid screw of a camera is moved and thus, the photo-taking lens of the camera is moved.

The output signal of the sensor 15 will now be described.

The metal block 1, which is in contact with earth electrode 19, assumes the earth potential. Lower metal block 3 does not assume the earth potential, which is the same potential as that of the electrode 19, due to the insulating washer 31 Therefore, the electrode 29, which is in contact with the lower metal block 3, is not at the earth potential.

Accordingly, an electrical signal output from sensor 15, corresponding to the vibration state of the vibrator 1, 3, is output from output terminals 27A and 29A through electrodes 27 and 29.

As described above, according to the present embodiment, the potentials of the upper and lower metal blocks are made different from each other by the insulating washer 31. Therefore, even if only one sensor 15 is used, the vibration state of the vibrator of the vibration type motor can be detected.

Description will now be made of another embodiment of the vibration type motor to which the present invention is applied.

Figure 4:
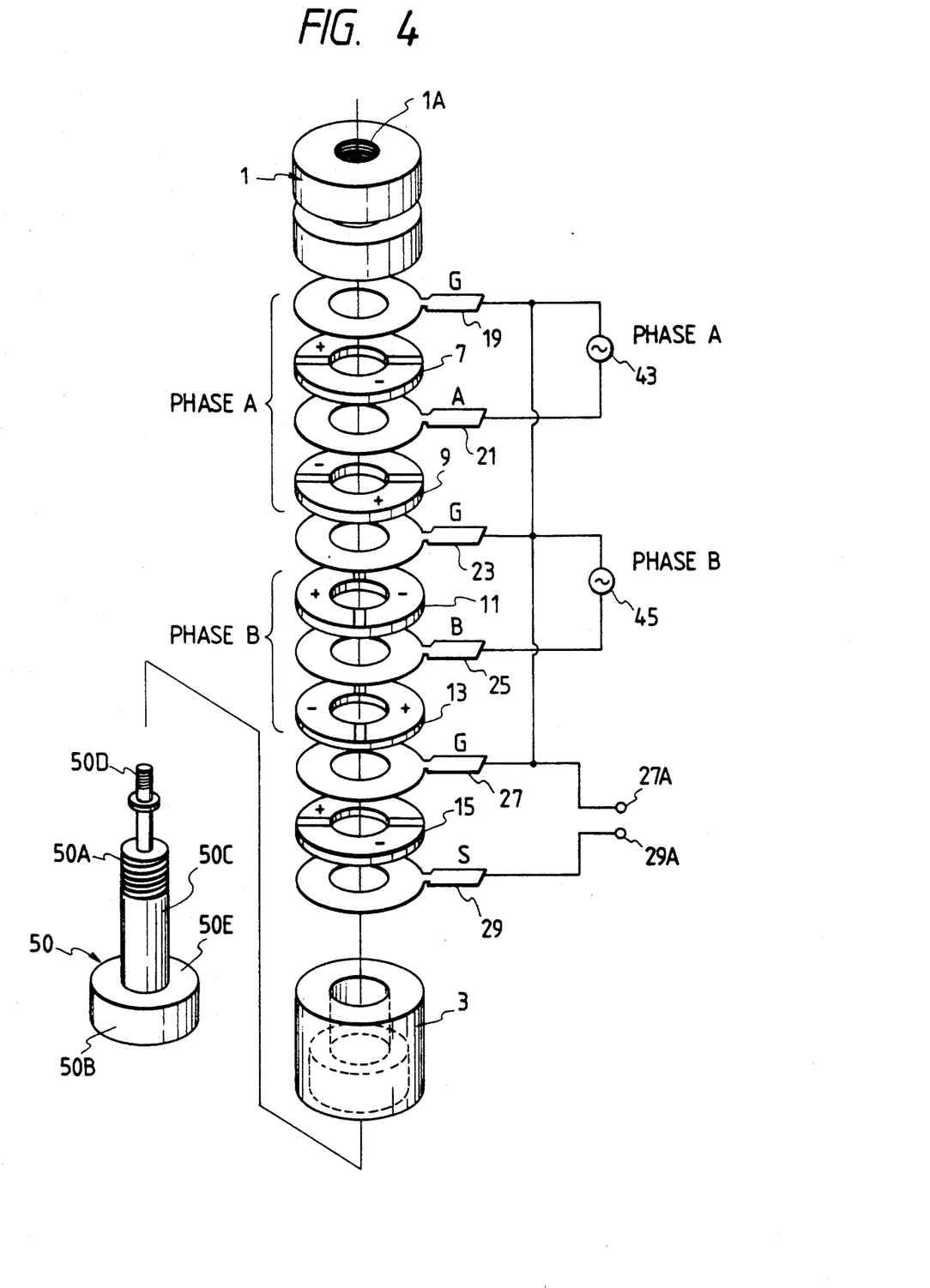
FIG. 4 is a fragmentary exploded perspective view of a second embodiment of the vibration type motor to which the present invention is applied.

FIG. 4 is an exploded perspective view of the vibration type motor according to a second embodiment of the present invention. In the case of the first embodiment, metal blocks 1 and 3 are prevented from assuming the same potential by the use of the insulating washer 31, while the second embodiment does not use a washer 31. That is, in the first embodiment, the bolt 5 is an electrically conductive metallic bolt. In the embodiment shown in FIG. 4, a bolt 50 made of an insulative material, for example, zirconia is used. In other elements in the second embodiment are the same as those in the first embodiment and therefore, are given the same reference numerals and need not be described.

Figure 5:
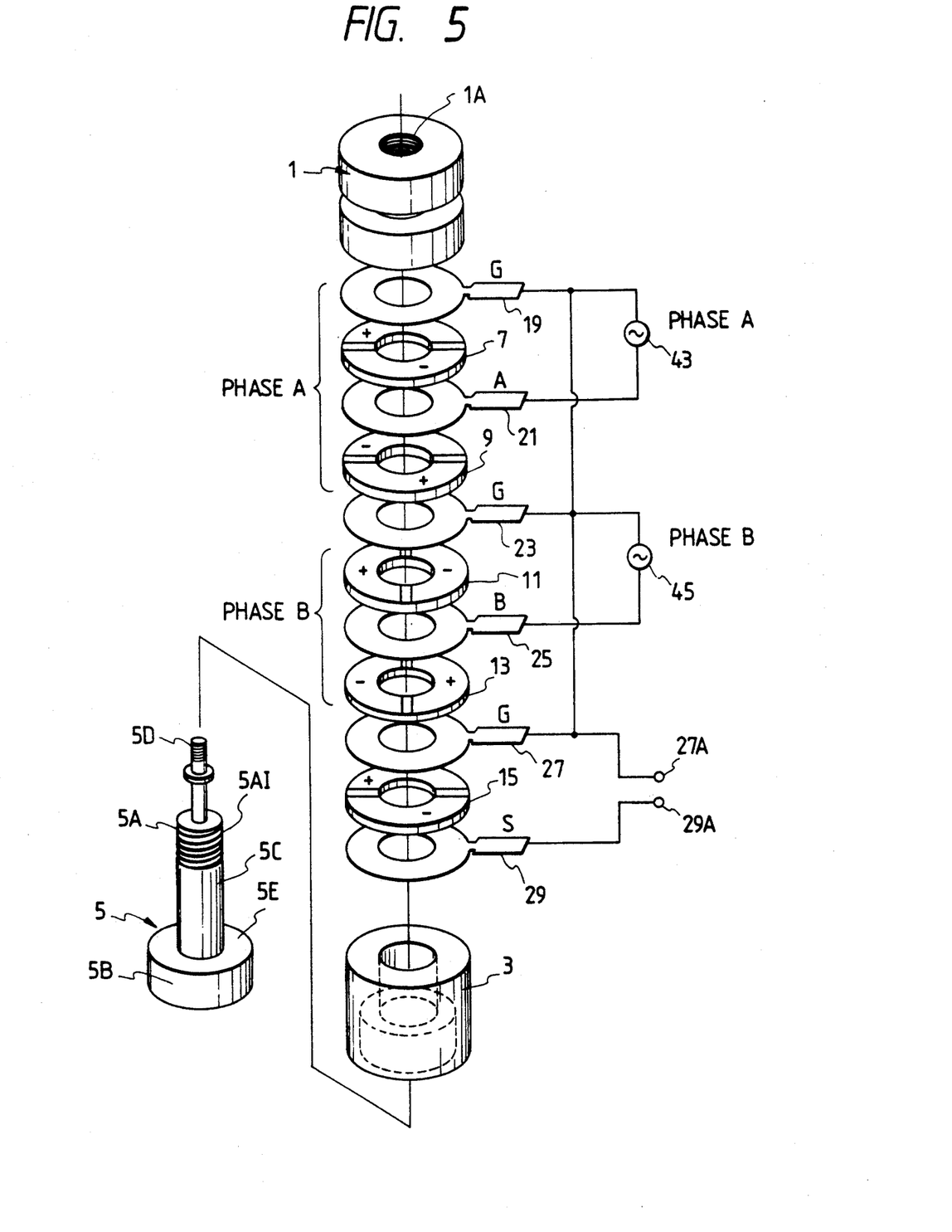
FIG. 5 is a fragmentary exploded perspective view of a vibration type motor according to a third embodiment of the present invention.
Figure 6:
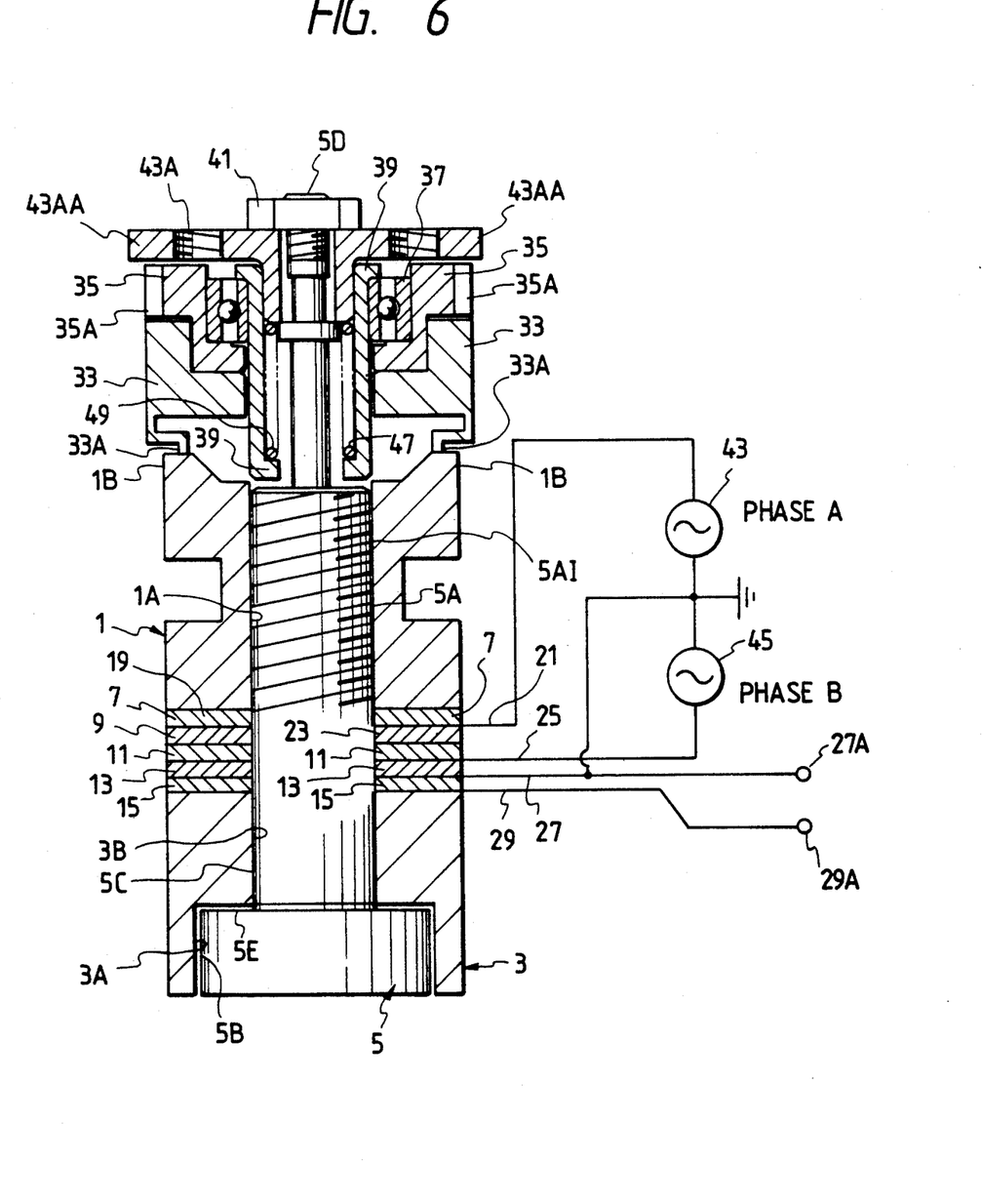
FIG. 6 is a cross-sectional view of the motor shown in FIG. 5.

FIGS. 5 and 6 shown an embodiment in which, as in the first embodiment, an electrically conductive bolt is used as the bolt 5. However, in this embodiment, the surface of the threaded portion 5A of the bolt 5 is coated with an insulating paint, to thereby electrically insulate the bolt 5 from the upper metal block 1, and the fixing member 43 (see FIG. 2) shown in the first embodiment is formed of an insulative ceramic or the like to prevent the upper and lower metal blocks 1 and 3 from being electrically short-circuited through the rotor 33, the output member 35, the bearing 37, the bolt 5, etc.

The other elements in the embodiment shown in FIGS. 5 and 6 are the same as those in the first embodiment and therefore, are given the same reference numerals and need not be described.

As described above, in the present invention, the vibration generating blocks constituting the ultrasonic vibrator are made different in potential from each other and therefore, a vibration detecting sensor can be eliminated. As a result, the ultrasonic vibrator and the vibration type motor using said ultrasonic vibrator as a drive source can be provided inexpensively.

What is claimed is:

1. A vibration device comprising:
   an electro-mechanical energy conversion element generating a vibration in response to an electrical signal supplied thereto through an electrode;
   electrically conductive resilient blocks holding said conversion element therebetween and generating vibrations corresponding to said vibration;
   a mechanical-electrical energy conversion element disposed between said blocks and producing a detection signal corresponding to the vibration state of said blocks; and
   a member for making the potentials of said blocks different from each other.

2. A vibration device for a vibration driven motor comprising:
   an electro-mechanical energy conversion element generating a vibration in response to an electrical signal supplied thereto through an electrode;
   electrically conductive metal blocks holding said conversion element therebetween and generating vibrations corresponding to said vibration;
   a mechanical-electrical energy conversion element disposed between said blocks and producing a detection signal corresponding to the vibration state of said blocks; and
   a member for making the potentials of said blocks different from each other.

3. A vibration device according to claim 2, wherein said member includes an insulating member for electrically insulating said blocks from each other.

4. A vibration device according to claim 3, wherein said insulating member is formed by an insulating washer interposed between said blocks.

5. A vibration device according to claim 3, wherein said mechanical-electrical energy conversion element includes a piezo-electric element.

6. A vibration driven motor having a movable member, comprising:
   an electro-mechanical energy conversion element having a hollow portion and generating a vibration in response to an electrical signal supplied thereto;
   electrically conductive first and second resilient blocks holding said conversion element therebetween, generating vibrations corresponding to said vibration and driving said movable member;
   a fastening member for fastening said first and second blocks through the hollow portion of said conversion element so that said first and second blocks may urge said conversion element;
   a mechanical-electrical energy conversion element disposed between said blocks and producing a detection signal corresponding to the vibration state of said blocks; and
   a member for making the potentials of said blocks different from each other.

7. A vibration driven motor according to claim 6, wherein said fastening member is formed by an electrically conductive bolt.

8. A vibration driven motor according to claim 7, wherein said mechanical-electrical energy conversion element includes a piezo-electric element.

9. A vibration driven motor according to claim 8, wherein the diameter of the hollow portion of said piezo-electric element is larger than the diameter of said bolt.

10. A vibration driven motor having a movable member, comprising:
    an electro-mechanical energy conversion element having a hollow portion and generating a vibration in response to an electrical signal supplied thereto;
    electrically conductive first and second resilient blocks holding said conversion element therebetween, generating vibrations corresponding to said vibration and driving said movable member;
    an insulative fastening member for fastening said first and second blocks through the hollow portion of said conversion element so that said first and second blocks may urge said conversion element; and
    a mechanical-electrical energy conversion element disposed between said blocks and producing a detection signal corresponding to the vibration state of said blocks.

11. A vibration driven motor according to claim 10, wherein said fastening member includes an insulating screw.

12. A vibration device, comprising:
    a first electro-mechanical energy conversion element for generating a first vibration having a first direction in response to a first electrical signal applied thereto through an electrode connected to a first electrical energy circuit;
    a second electro-mechanical energy conversion element for generating a second vibration having a second direction different from the first direction of said first vibration in response to a second electrical signal applied thereto through an electrode connected to a second electrical energy circuit;

electrically conductive resilient blocks for holding said conversion elements therebetween and for generating a combined vibration of said first vibration and said second vibration therein;

a mechanical-electrical energy conversion element disposed between the blocks, with an electrode disposed between the mechanical-electrical energy conversion element and at least one of said blocks, and for producing a detection signal corresponding to the vibration state of said blocks; and a member for making the potentials of said blocks different from each other.

13. A vibration device according to claim 12, wherein said member includes an insulating member for electrically insulating said blocks from each other.

14. A vibration device according to claim 12, wherein said insulating member is formed by an insulating washer interposed between said blocks.

15. A vibration device according to claim 12, wherein said second electrical signal has a phase difference in time to said first electrical signal.

16. A system having a vibration device as a driving power source, the system comprising:

an electro-mechanical energy conversion element generating a vibration in response to an electrical signal supplied thereto through an electrode;

electrically conductive resilient blocks holding said conversion element therebetween and generating vibrations corresponding to said vibration;

a mechanical-electrical energy conversion element disposed between said blocks and producing a detection signal corresponding to the vibration state of said blocks;

a member for making the potentials of said blocks different from each other; and a movable member arranged to be driven by one of said blocks.

* * * * *

UNITED STATES PATENT AND TRADEMARK OFFICE
CERTIFICATE OF CORRECTION

PATENT NO. : 5,231,325
DATED : July 27, 1993
INVENTOR(S) : TAMAI, ET AL.

It is certified that error appears in the above-indentified patent and that said Letters Patent is hereby corrected as shown below:

COLUMN 1
    Line 16, "the" should read --a--;
    Line 20, "upon, the other and," should read --upon the other, and--;
    Line 23, "elements" should read --elements,--; and
    Line 64, "Alternatively" should read --Alternatively,--.

COLUMN 4
    Line 5, "now" should read --not--.

COLUMN 5
    Line 13, "In" should read --The--.

Signed and Sealed this

Twenty-second Day of March, 1994

Attest:

BRUCE LEHMAN

*Attesting Officer*     *Commissioner of Patents and Trademarks*